US005730028A

United States Patent [19]
Maue et al.

[11] Patent Number: 5,730,028
[45] Date of Patent: Mar. 24, 1998

[54] LINKAGE FOR A POWER LIFTGATE LOCK SYSTEM

[75] Inventors: H. Winston Maue; Shawn P. Slusser, both of Farmington Hills, Mich.

[73] Assignee: United Technologies Automotive, Inc., Dearborn, Mich.

[21] Appl. No.: 681,193

[22] Filed: Jul. 22, 1996

[51] Int. Cl.$^6$ .......................... B62D 33/037; G05G 11/00
[52] U.S. Cl. ............... 74/480 R; 292/252; 292/DIG. 43; 292/DIG. 62; 403/92
[58] Field of Search ............................ 74/480 R, 483 K; 292/DIG. 27, DIG. 43, DIG. 62, 252; 403/92

[56] References Cited

U.S. PATENT DOCUMENTS

| | | |
|---|---|---|
| 3,902,379 | 9/1975 | Bennett et al. .................... 74/480 R |
| 4,093,289 | 6/1978 | Inabayashi et al. ............. 292/DIG. 62 |
| 4,102,213 | 7/1978 | Smith .................................. 292/201 X |
| 4,290,634 | 9/1981 | Gelhard ................................. 292/201 |
| 4,793,640 | 12/1988 | Stewart, Sr. ........................ 292/201 |

*Primary Examiner*—Allan D. Herrmann
*Attorney, Agent, or Firm*—Howard & Howard

[57] ABSTRACT

A linkage has a coupled state, where actuation of a multi-functional apparatus causes an interference device to move between the locked position and the unlocked position, wherein in the locked position the interference device does not allow a handle for opening door latches to actuate, and in the unlocked position the interference device allows the handle to actuate. The linkage further has a decoupled state, where actuation of the manual actuation device causes the decoupling linkage to uncouple from the multi-functional apparatus, and causes the interference device to move between the locked and the unlocked positions without moving the multi-functional apparatus. This arrangement allows for a manual override of the power liftgate lock multi-functional apparatus.

7 Claims, 5 Drawing Sheets

LINKAGE FOR A POWER LIFTGATE LOCK SYSTEM

TECHNICAL FIELD

The present invention relates to power liftgate lock systems, and more particularly to decoupling linkage for manually overriding the actuation of the power liftgate lock system.

BACKGROUND OF THE INVENTION

Sport utility and minivan vehicles typically include a liftgate or rear door consisting of a one-piece unit. An upper or lower pair of hinges coupled to the body structure allow the liftgate to pivot thus allowing access to a cargo area. The liftgate most commonly contains a fixed or movable glass rear window with a window release mechanism, a wiper assembly for cleaning the rear window, a handle for actuating a latch for opening the liftgate from the closed position, and a power liftgate lock system. In most cases, for both convenience and safety, the liftgate lock system includes a manual actuation device also for controlling actuation of the handle.

It is common for actuation of the handle to cause the latches to disengage the liftgate from the body of the vehicle, thus allowing the liftgate to be opened to allow access to the cargo area. However, when the latch is engaged with the body, the liftgate cannot be inadvertently opened. The power liftgate lock system controls actuation of the handle, consequently allowing or restricting the latches from opening. The manual actuation device typically includes a key operated mechanism and a plunger mechanism, which allow the operator to manually control the liftgate handle actuation.

Traditionally, three separate motors or solenoids were required to actuate a window release mechanism, the wiper assembly, and the power liftgate lock system. However, of particular interest here is a single multi-functional apparatus for actuating these three mechanisms. The multi-functional apparatus employs a main intermittent motion mechanism or rotatable helical gear, which includes a drum concentrically disposed and fixedly attached therein and a Geneva pin extending therefrom. The drum contains a circular exterior surface having an indentation. The multi-functional apparatus further includes a single reversible electric motor for rotating the helical gear clockwise or counterclockwise, and three intermittent rotary motion mechanisms or cams disposed about the helical gear. The electric motor has an armature shaft with a worm gear on the free end which connects to the helical gear. Each cam has an open channel for receiving the Geneva pin, and a partially curved external surface which mates with the external surface of the drum. The pin is positioned so that when it enters the channel of each cam only that cam rotates, and the channel is aligned with the indentation throughout this rotation. When the pin is not within the channel, the channel will not be aligned with the indentation of the drum, and the surface of the drum prevents rotation of that cam.

The first cam is linked to the wiper assembly. Movement of the pin into the channel of the first cam rotates the first cam and the wiper. By reversing the motor, the rotation of the helical gear, pin, and cam are reversed, thus rotating the wiper back to the starting position.

The second cam, through a linkage, allows or restricts actuation of the liftgate handle, thus providing the power liftgate lock/unlock function. When a liftgate lock/unlock switch is actuated to lock or unlock the liftgate, the motor causes the helical drive gear to rotate via the worm gear, so that the pin moves into the channel within the second cam, thus rotating the second cam. Rotation of the second cam in one direction causes the linkage not to interfere with the handle. As a result, the handle may open the latches when used. Reversing the motor, causes the cam to rotate in the opposite direction. As a result, the linkages interfere with the handle restricting it from opening the latches.

The third cam is attached to the liftglass release mechanism. When a liftglass release switch is actuated to unlock the rear window, the motor causes the helical drive gear to rotate via the worm gear, so that the pin moves into the channel within the third cam. Rotating the third cam in one direction causes the liftglass release mechanism to unlatch the rear window.

In most cases, for both convenience and safety the liftgate also contains the key operated mechanism and the plunger mechanism, which allow the operator to manually allow or restrict handle actuation. One possible liftgate lock system for providing this manual lock/unlock function includes a gear powered by an electric motor. The gear has at least one pin extending therefrom. The system further includes a rotatable cam having a slot for receiving the pin. One link pivotally connects the cam to the door latch. Another link pivotally connects the door latch to the key operated mechanism and the plunger mechanism. Upon rotation of the gear the pin enters the slot and drives the cam between the locked and unlocked positions; however once in either position the pin exits the slot so that the cam is free to rotate to the opposite position. Since the cam is free to rotate after actuation by the powered gear, if the operator manually actuates the latch by using the key or the plunger, the latch is free to latch or unlatch as manually directed.

Therefore, an apparatus is sought, which manually allows or restricts actuation of the liftgate handle through use of the key or movement of the plunger mechanism, the apparatus being for use with the multi-functional apparatus.

DISCLOSURE OF THE INVENTION

Sport utility type vehicles include a liftgate having latches for securing the liftgate to the body of the vehicle, a handle, and a power liftgate lock system. Actuation of the handle opens the latches so that the liftgate can be opened. The liftgate lock system includes an interference device, a multi-functional apparatus, a manual actuation device, and a linkage of the present invention. The interference device has a locked position where the handle cannot be actuated and an unlocked position where the handle can be actuated. The multi-functional apparatus has a rotatable cam connected to the interference device through the linkage. The manual actuation device also is connected to the interference device.

The linkage has a coupled state, where actuation of the multi-functional apparatus causes the interference device to move between the locked position and the unlocked position. The linkage further has a decoupled state, where actuation of the manual actuation device causes the linkage to uncouple from the cam, and causes the interference device to move between the locked position and the unlocked position without moving the cam.

According to one embodiment of the linkage of the present invention the linkage includes a first element, a second element and a coupling. The first element is connected to the interference device, such that movement of the first element moves the interference device between the locked position and the unlocked position. The second element is pivotally supported by a pin. The second element defines a bore through one portion thereof. The first element extends through the bore. A second portion of the second element is pivotally connected to the arm, such that movement of the arm causes the second element to pivot. The coupling has an engaged mode where the first element is fixed with respect to the second element and a disengaged mode where the first element is movable with respect to the second element.

The foregoing invention will become more apparent in the following detailed description of the best mode for carrying out the invention and in the accompanying drawings.

BRIEF DESCRIPTION OF THE DRAWINGS

FIG. 2, is an enlarged view along line 2 of FIG. 1 of the preferred embodiment of a coupling of the linkage of the present invention.

FIG. 3 a–b are partial sectional views of the coupling along line 3 of FIG. 2 with the coupling in a coupled and a decoupled mode.

FIG. 4 a is a front view of a liftgate lock system which is synchronized, and where an interference device is in an unlocked position.

FIG. 4 b is a from view of the liftgate lock system of FIG. 4a, which has been manually locked.

FIG. 4 c is a front view of the liftgate lock system of FIG. 4b, where the system has received an electrical command to unlock.

FIG. 4 d is a front view of the liftgate lock system of FIG. 4c, where the system has been electrically unlocked and is synchronized.

FIG. 7 a is a front view of a liftgate lock system which is synchronized, and where an interference device is in a locked position.

FIG. 7 b is a front view of the liftgate lock system of FIG. 7a, which has been manually unlocked.

FIG. 7 c is a front view of the liftgate lock system of FIG. 7b, where the system has received an electrical command to lock.

FIG. 7 d is a front view of the liftgate lock system of FIG. 7c, where the system has been electrically locked and is synchronized.

BEST MODE FOR CARRYING OUT AN EMBODIMENT OF THE INVENTION

Figure 1:
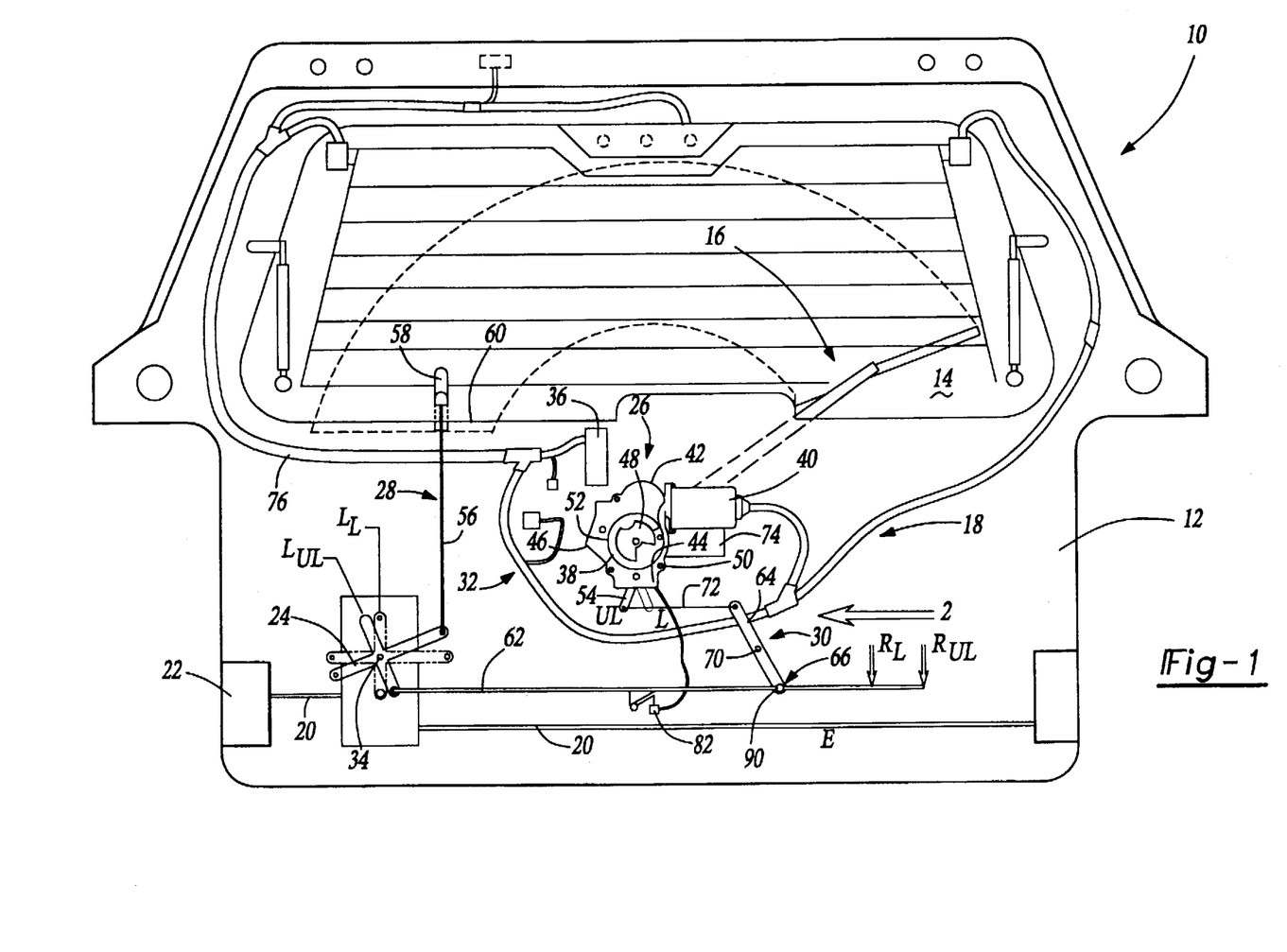
FIG. 1, is a front elevation view of the preferred embodiment of a linkage of the present invention for use with a multi-functional apparatus.

Referring to FIG. 1, a sport utility vehicle 10 includes a liftgate or rear door 12 which can pivot about an upper pair of hinges (not shown) coupled to the vehicle body structure. The liftgate 12 has a movable rear window or backlite 14, a wiper assembly 16, a handle (not shown), and a liftgate lock system 18. In this embodiment, the handle (not shown) through linkages 20 actuate latches 22 for securing or releasing the liftgate 12. The handle may be of conventional type, which upon rotation causes the latches 22 to spring open.

The liftgate lock system 18 includes an interference device 24, a multifunctional apparatus 26, a manual actuation device 28, a decoupling linkage 30, and a control system 32. The interference device 24 allows or restricts actuation of the handle (not shown) by moving between a locked position and an unlocked position. In this embodiment, the interference device 24 is a four armed lever which pivots about a pin 34. In the locked position (partially shown in phantom) designated by the symbol $L_L$, the lever 24 will stop rotation of the handle, so that the handle cannot release the latches 22 when actuated. In the unlocked position designated by the symbol $L_{UL}$, the lever 24 will not stop rotation of the handle, so that the handle can open the latches 22 when actuated.

The multi-functional apparatus 26 is mounted upon an inner surface of the liftgate 12. The multi-functional apparatus actuates the wiper assembly 16, a liftglass release latch 36, and the decoupling linkage 30. An example of such a multi-functional apparatus is disclosed in U.S. application Ser. No. 08/430,388, entitled "Multi-Functional Apparatus Employing an Intermittent Motion Mechanism" by W. Zimmer and J. Gibson, and U.S. Application Serial No. 08/431,149, entitled "Control System for an Automotive Vehicle Multi-Functional Apparatus" by H. Winston Maue, Shawn P. Slusser, Jeffery L. Kuczycki, and Ronald Zaleski incorporated in their entirety herewith. In operation, the majority of the multi-functional apparatus 26 is hidden by an interior trim panel (not shown for clarity). The multi-functional apparatus 26 includes a rotatable helical gear 38, a single electric motor 40 for rotating the helical gear 38, and a plurality of rotating cams 42, 44, and 46 for transferring the rotation from the gear 38 to the various mechanisms. The helical gear 38 includes a drum 48 concentrically disposed and fixedly attached therein, and a Geneva pin 50 extending therefrom. The first cam 42 actuates the wiper assembly 16. The second cam 44 through the decoupling linkage 30 is connected to the lever 24. Each cam has an open channel 52 for receiving the Geneva pin 50 and a partially curved external surface which mates with the external surface of the drum 48. An arm 54 is rigidly attached to the second cam 44, so that rotation of the cam 44 causes the arm 54 to rotate. The cam 44 and arm 54 have a locked position, designated by the letter L, and an unlocked position designated by the letters UL as shown in FIG. 1.

The manual actuation device 28 is connected to the lever 24. In this embodiment, the manual actuation device 28 includes a rod 56 connecting a plunger 58 to one arm of the lever 24, so that the plunger 58 extends above the lower edge 60 of the window and is accessible from the interior of the vehicle. The manual actuation device 28 further includes a conventional key receiving mechanism (not shown) which is connected through conventional means to another arm of the lever 24. In operation, lifting the plunger 58 causes the lever 24 to rotate from the locked $L_L$ to the unlocked $L_{UL}$ position. Lowering the plunger 58 causes the lever 24 to rotate from the unlocked position $L_{UL}$, to the locked position $L_L$. Upon receiving and turning the key the lever 24 is similarly actuated between the locked and unlocked positions.

Figures 2, 3A, 3B:
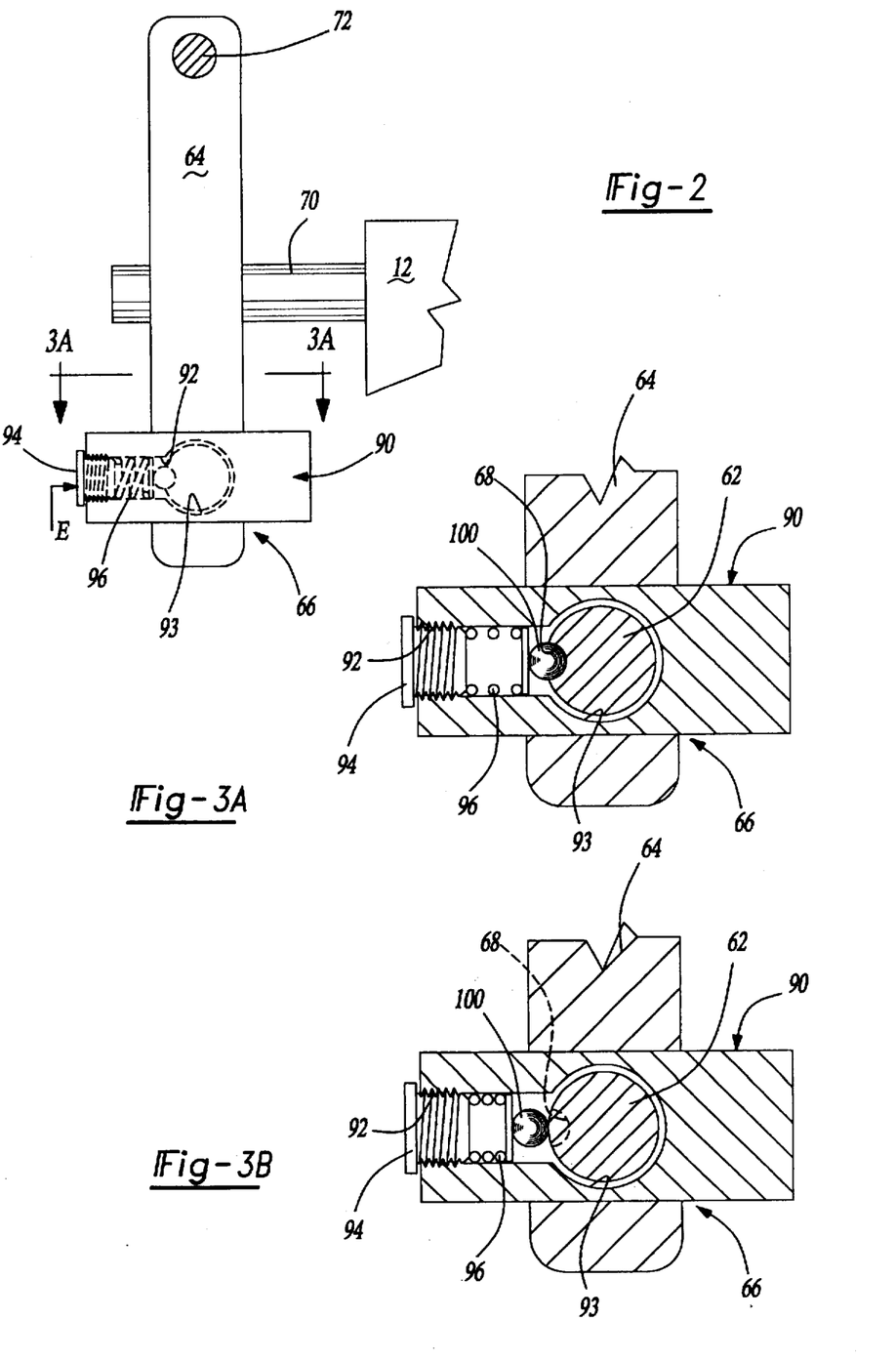

The linkage 30 includes a first element 62, a pivotable second element 64, and a coupling 66. The first element 62 is pivotally connected to another arm of the lever 24. The first element 62 may be a rod or the like. The first element 62 includes a detent 68 (as shown in FIG. 3a). The second element 64 pivots about a pin 70 and defines a bore 92 (as shown in FIG. 2) through one portion of the second element 64. The second element 64 may be a crank, lever or the like. The first element 62 extends through the bore 92 in the second element 64. A second portion of the second element 64 being connected to the arm 54 by a rod 72. In another embodiment, a cable including a sheathed wire may replace the rod 72. The coupling 66 releasably connects the second element 64 and the first element 62 at an engagement point, designated by the letter E. The coupling has a coupled or engaged mode where the first element 62 is fixed with respect to the second element 64, and a decoupled or disengaged mode where the first element 62 is movable with respect to the second element 64. When the lever 24 is in the unlocked position $L_{UL}$, the end of the first element 62 has first element unlocked position indicated by the symbol $R_{UL}$. When the lever 24 is in the locked position $L_L$, the end of the first element has a first element locked position indicated by the symbol $R_L$.

The control system 32 includes at least one main body controller (not shown), a rear node microprocessor 74 in communication with the main body controller, a wire harness 76, and a liftgate lock limit position switch 82. The wire harness 76 connects the motor 40 to the liftgate lock limit position switch 82. For the liftgate lock limit position switch 82 a single pole single throw switch or the like may be used, which produces a signal indicative of the position of the lever 24 through engagement and disengagement with the decoupling linkage 30. The control system 32 further includes a plurality of sensors (not shown) mounted on the rear face of the helical gear 38. These sensors are connected to the microprocessor 74 and produce a signal indicative of the position of the multi-functional apparatus 26.

Referring to FIGS. 2, 3a and b, the coupling 66 includes a vessel 90 having a partially longitudinally extending first bore 92, a transversely extending second bore 93, a screw 94, a spring 96, and a ball 100. In this embodiment the vessel is cylindrical and supported on lever 64 so that the two move together as discussed below. The first bore 92 is threaded. The first element 62 extends through the second bore 93. The ball is disposed within the first bore 92 adjacent the first element 62. The spring 96 is then disposed within the first bore adjacent the ball 100, and the screw 94 engages with the threads in the first bore 92. As the screw is advanced into the first bore 92, the screw forces the spring 96 into engagement with the ball 100, thus the screw and the spring act as a clamp for forcing the ball against the first element so that when the ball 100 is within the detent 68 in the first element 62 (as shown in FIG. 3a), the coupling 66 is in the coupled mode. As shown in FIG. 3ba, when the ball 100 is not in the detent 68, the coupling 66 is in the decoupled mode.

Figures 4A, 4B:
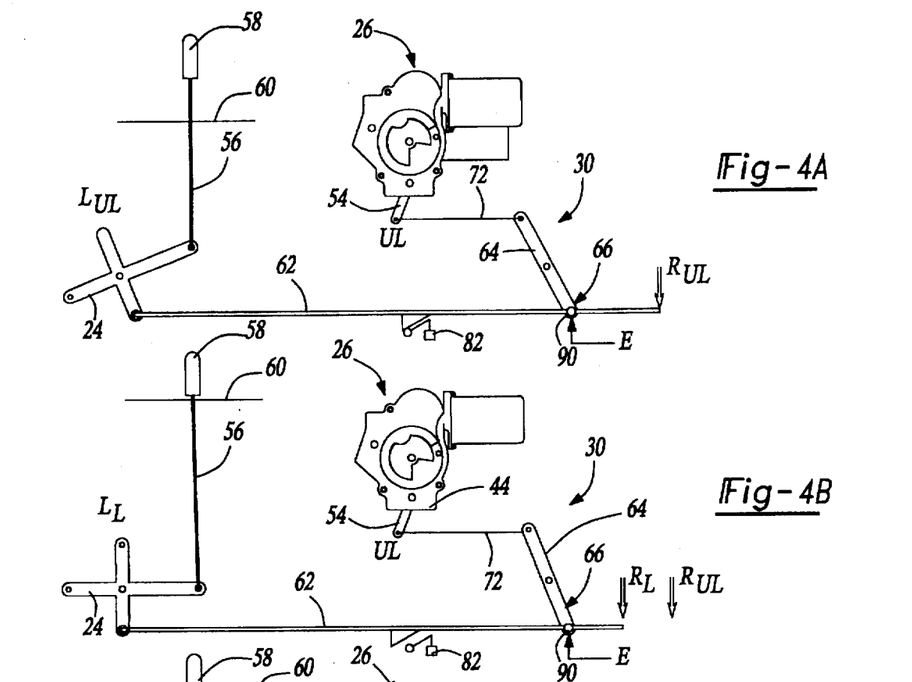

Referring to FIG. 4a, operation of the liftgate lock system 18 will now be discussed. The multi-functional apparatus 26, the lever 24, and the first element 62 are in the unlocked positions UL, $L_{UL}$, and $R_{UL}$, respectively. Since all the components are in the unlocked positions, the system 18 is said to be "synchronized." If the operator manually locks the liftgate 12 by lowering the plunger 58, the lever 24 will pivot from the unlocked position $L_{UL}$ (as shown in FIG. 4a) to the locked position $L_L$ (as shown in FIG. 4b), and the multi-functional apparatus will not move. Since the release force necessary to cause the coupling 66 to decouple is less than the force provided by the manual actuation of the lever 24, rotation of the lever 24 will cause the first element 62 to slide with respect to the second element 64, and will cause the decoupling linkage 30 to go to the decoupled mode (as shown in FIG. 4b). The first element 62 moves from the first element unlocked position $R_{UL}$, to the first element locked position $R_L$, and the detent 68 is no longer aligned with the engagement point E. As a result, the multi-functional apparatus does not move, and the liftgate lock limit position switch 82 will report a locked condition for the lever 24 to the microprocessor 74.

Figure 5:
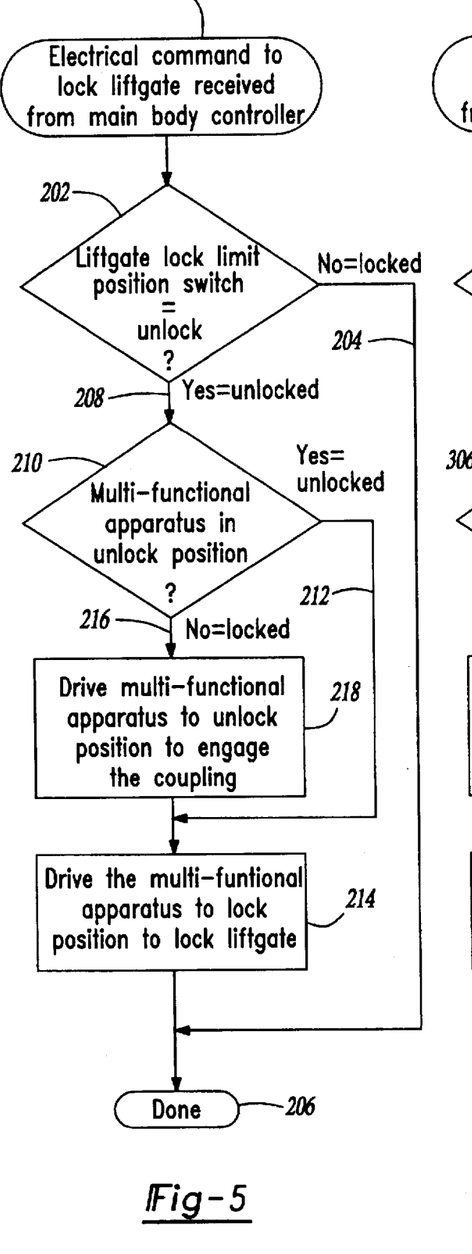
FIG. 5 is a flow diagram of a lock command subroutine of the preferred embodiment of the control system of the present invention.

Referring to FIGS. 1, 4b, and 5, if the control system 32 receives an electrical command to lock (200) the liftgate 12 from the main body controller (not shown), first the microprocessor 74 checks to see if the liftgate lock limit position switch 82 is unlocked (202). The switch will indicate no (204), since the lever 24 is already in the locked position $L_L$. The control system 32 will be done (206). Therefore, no movement of the multi-functional apparatus 26 is required, since the system is already locked.

Figure 6:
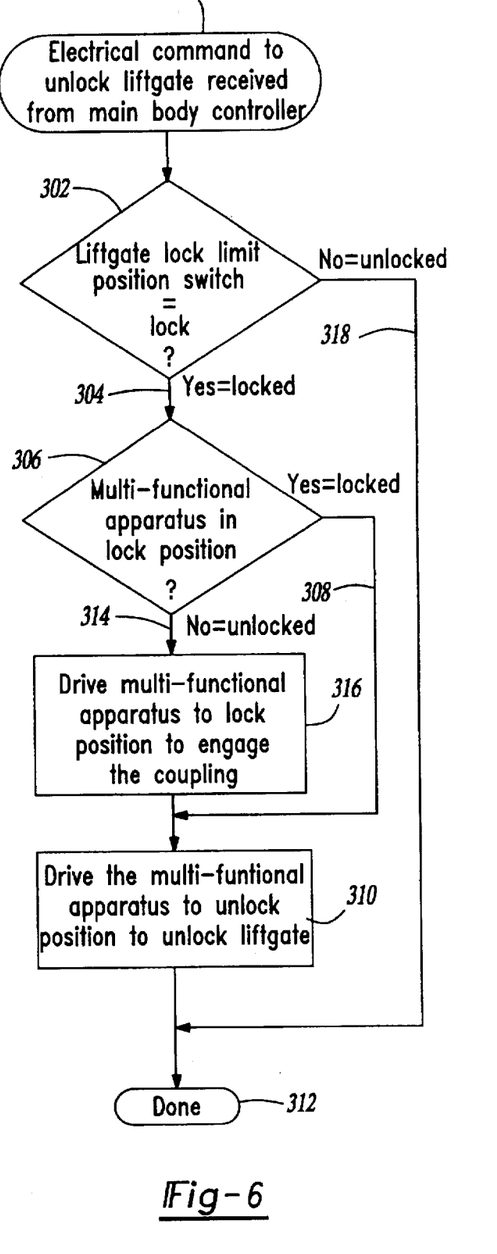
FIGS. 6 is a flow diagram of an unlock command subroutine of the preferred embodiment of the control system of the present invention.

Referring to FIGS. 1, 4b, and 6, if the control system 32 receives an electrical signal to unlock (300) the liftgate 12 from the main body controller (not shown), first the microprocessor checks to see if the liftgate lock limit position switch 82 is locked (302). The switch 82 will indicate yes (304), that the liftgate lock limit position switch indicates locked. Next, the microprocessor 74 checks to see if the second cam 44 of the multi-functional apparatus 26 is in the locked position L (306) via the sensors (not shown) on the helical gear 38. If the system were synchronized, the multi-functional apparatus 26 would indicate yes (308), that the cam 44 was in the locked position L via the sensors (not shown) on the helical gear 38. Then the microprocessor 74 would drive the cam 44 from the locked position L to the unlocked position UL (310). The control system 32 will be done (312).

Figure 4C:
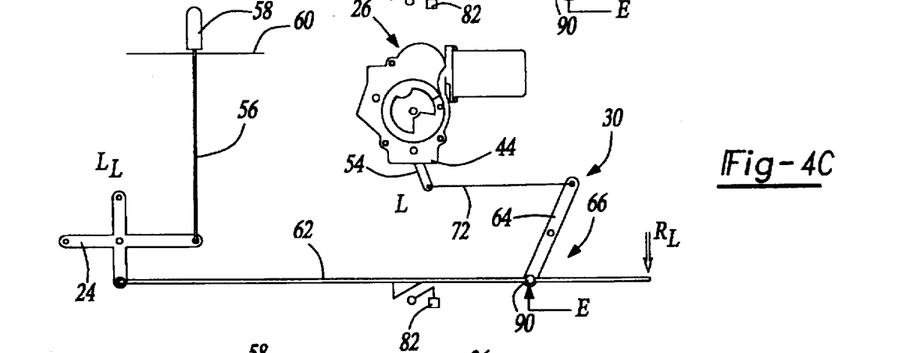
Figure 4D:
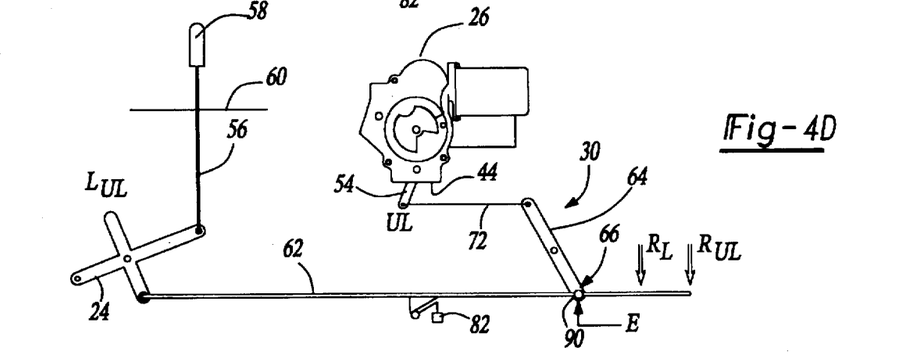

However, as shown in FIG. 4b, the system is not synchronized and the multifunctional apparatus 26 through the sensors (not shown) on the helical gear 38, indicates that the cam 44 is not in the locked position L (314). The microprocessor 74 through the multi-functional apparatus 26 pivots the cam 44 from the unlocked position UL (as shown in FIG. 4b) to the locked position L (as shown in FIG. 4c) (316). This causes first element 72 to pivot the second element 64, so that the engagement point E aligns with the detent 68, the ball 100 (as shown in FIG. 3a) enters the detent 68, and the coupling 66 returns to the coupled mode. Driving the cam 44 in the aforementioned step did not cause the first element 62 to move from the locked position $R_L$, thus the lever 24 remains in the locked position $L_L$. Then the microprocessor 74 through the multi-functional apparatus 26 pivots the cam 44 from the locked position L (as shown in FIG. 4c) to the unlocked position UL (as shown in FIG. 4d) (310). Pivoting the cam 44 with the coupling 66 engaged causes the rod 72 to pivot the second element 64. Thus pivoting the second element 64 causes the first element 62 to move from the first element locked position R to the first element unlocked position $R_{UL}$, which consequently causes the lever 24 to pivot from the lever locked position $L_L$ to the lever unlocked position $L_{UL}$. Pivoting the lever 24 thus, will cause the rod 56 to raise the plunger 58 above the window edge 60. The liftgate lock system 18 is now synchronized, and the liftgate lock limit position switch 82 will indicate that the lever 24 is unlocked. The control system 32 will be done (312).

Figure 7A:
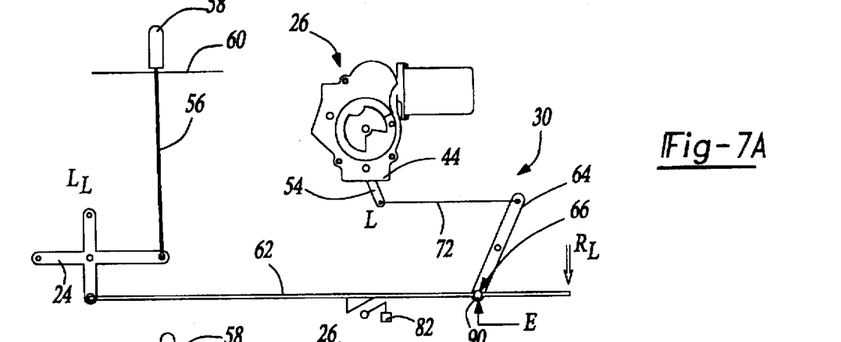
Figure 7B:
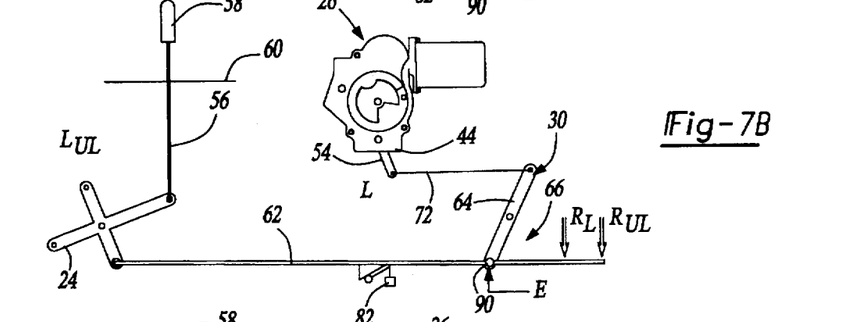

Referring to FIG. 7a, operation of the liftgate lock system will be further discussed. During operation, the multi-functional apparatus 26, the lever 24, and the first element 62 are in the locked position L, $L_L$, and $R_L$, respectively. Since all the components are in the locked positions, the system is said to be "synchronized." If the operator manually unlocks the liftgate 12 by raising the plunger 58, the lever 24 will pivot from the locked position $L_L$, (as shown in FIG. 7a) to the unlocked position $L_{UL}$ (as shown in FIG. 7b). Since the release force necessary to cause the coupling 66 to decouple is less than the force provided by the manual actuation of the lever 24, rotation of the lever 24 will cause the first element 62 to slide with respect to the second element 64, and will cause the decoupling linkage 30 to go to the decoupled mode (as shown in FIG. 7b), and the multi-functional apparatus 26 will not move. The first element 62 moves from the locked position $R_{UL}$ to the unlocked position $R_L$, and the detent 68 is no longer aligned with the engagement point E. As a result, the multi-functional apparatus 26 does not move, and the liftgate lock limit position switch 82 will report an unlocked condition for the lever 24.

Referring to FIGS. 1, 7b, and 6, if the control system 32 then receives an electrical command to unlock (300) the liftgate 12 from the main body controller (not shown), first the microprocessor 74 checks to see if the liftgate lock limit position switch 82 is locked. The switch will indicate that the lever 24 is already in the unlocked position $L_{UL}$ (318). The control system 32 is done (312). Therefore, no movement of the multi-functional apparatus 26 is required, since the system is already unlocked.

Referring to FIGS. 1, 7b, and 5, if the control system 32 receives an electrical signal to lock (200) the liftgate 12 from the main body controller (not shown), first the microprocessor 74 checks to see if the liftgate lock limit position switch 82 is unlocked (202). The switch will indicate yes (208), that the switch is unlocked. Next, the microprocessor 74 checks to see if the second cam 44 of the multi-functional apparatus 26 is in the unlocked position UL (210) via the sensors on the helical gear 38. If the system were synchronized, the multi-functional apparatus 26 would indicate yes (212), that the cam 44 was in the unlocked position UL. Then the microprocessor 74 would drive the cam 44 from the unlocked position UL to the locked position L (214). The control system is done (206).

Figure 7C:
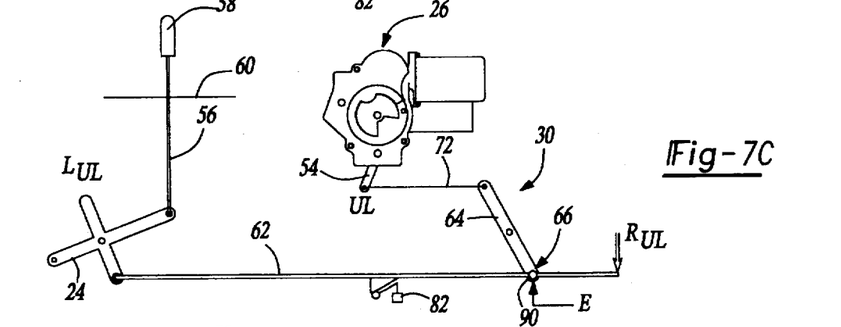
Figure 7D:
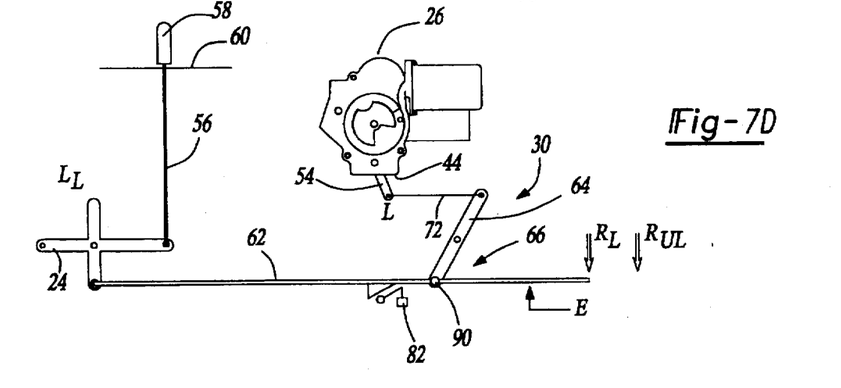

However, as shown in FIG. 7b, the system is not synchronized and, the multifunctional apparatus 26 through the sensors (not shown) on the helical gear 38 indicates that the cam 44 is not in the unlocked position UL (216). The microprocessor 74 through the multi-functional apparatus 26 pivots the cam 44 from the locked position L (as shown in FIG. 7b) to the unlocked position UL (as shown in FIG. 7c) (218). This causes first element 72 to pivot the second element 64, so that the engagement point E aligns with the detent 68, the ball 100 (as shown in FIG. 3a) enters the detent 68, and the coupling 66 returns to the coupled mode. Driving the cam 44 in the aforementioned step did not cause the first element 62 to move from the unlocked position $R_{UL}$, thus the lever 24 remains in the unlocked position $L_{UL}$. Then the microprocessor 74 through the multi-functional apparatus 26 pivots the cam 44 from the unlocked position UL (as shown in FIG. 7c) to the locked position L (as shown in FIG. 7d) (214). Pivoting the cam 44 with the coupling engaged causes the rod 72 to pivot the second element 64. Thus pivoting the second element 64 causes the first element 62 to move from the unlocked position $R_{UL}$ to the first element locked position $R_L$, which consequently causes the lever 24 to pivot from the lever unlocked position $L_{UL}$ to the lever locked position $L_L$. Pivoting the lever thus, will cause the rod 56 to lower the plunger 58 toward the window edge 60. The liftgate lock system 18 is now synchronized and the liftgate lock limit position switch 82 will indicate that the lever 24 is locked. The control system 32 is done (206).

The principal advantage of the improved liftgate lock system is that it allows for the operator to manually lock or unlock the liftgate of a vehicle which is actuated by a multi-functional apparatus. The multi-functional apparatus cannot be back driven by the manual accuation device to achieve the same results of the present invention, due to the geometry of the second cam and the use of the worm gear. The system further has the advantage of being compact enough to fit within the limited space of the liftgate. Other advantages of the present invention are that it is economical, reliable, and easy to manufacture and assemble.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include but are not limited to connecting the decoupling mechanism directly to the latches so that rotation of the interference device causes the latches to open. The linkage may utilize another interference device or handle. It is therefore contemplated that the appended claims will cover any such modification or embodiments that fall within the true scope of the invention.

We claim:

1. A linkage for use with a cam having an arm attached thereto, and an interference device which may be moved between a locked position and an unlocked position, wherein the linkage comprises:

a first element being connected to the interference device, such that movement of said first element causes the interference device to move between the locked position and the unlocked position;

a second element being pivotally supported by a pin, said second element defining a bore through one portion thereof, said first element extending through said bore, and a second portion being pivotally connected to an arm, such that movement of the arm causes said second element to pivot; and a coupling having an engaged mode where the first element is fixed with respect to the second element and a disengaged mode where the first element is movable with respect to the second element through said bore.

2. The linkage of claim 1, wherein said first element further includes a detent and said coupling further comprises:

a vessel with a partially longitudinally extending first bore, and a transversely extending second bore, said second bore for receiving said first element;

a ball disposed within said first bore adjacent said first element;

a clamp for forcing the ball against the first element, such that when said ball is within said detent said coupling is in the engaged mode, and when said ball is out of said detent said coupling is in the disengaged mode.

3. The coupling of claim 2, wherein the fist bore of the vessel is threaded and said clamp further comprises:

a spring disposed within fist bore adjacent said ball; and a screw engaged with the threads of the vessel, so that said screw forces said spring into engagement with said ball.

4. A liftgate lock system for a motor vehicle, comprising:

an interference device which may be moved between a locked position and an unlocked position;

a multi-functional apparatus that selectively controls movement of said interference device and at least one other device supported on the vehicle, said apparatus having a rotatable cam;

a manual actuation device connected to the interference device; and a linkage connecting the cam to the interference device; said linkage having a coupled state where actuation of the multi-functional apparatus causes the interference device to move between the locked position and unlocked position and a decoupled state where actuation of the manual actuation device causes the linkage to uncouple from the cam and causes the interference device to move between the locked position and the unlocked position without moving the cam.

5. The liftgate lock system of claim 4, wherein the linkage further comprises:

a first element being connected to the interference device, such that movement of said first element causes the interference device to move between the locked position and the unlocked position;

a second element being pivotally supported by a pin, said second element defining a bore through one portion thereof, said first element extending through said bore, and a second portion being pivotally connected to an arm, such that movement of the arm causes said second element to pivot; and a coupling having an engaged mode where the first element is fixed with respect to the second element and a disengaged mode where the first element is movable with respect to the second element through said bore.

6. The linkage of claim 5, wherein said first element further includes a detent and said coupling further comprises:

a vessel with a partially longitudinally extending first bore, and a transversely extending second bore, said second bore for receiving said first element;

a ball disposed within said first bore adjacent said first element;

a clamp for forcing the ball against the first element, such that when said ball is within said detent said coupling is in the engaged mode, and when said ball is out of said detent said coupling is in the disengaged mode.

7. The coupling of claim 6, wherein the first bore of the vessel is threaded and said clamp further comprises:

a spring disposed within fist bore adjacent said ball; and a screw engaged with the threads of the vessel, so that the screw forces said spring into engagement with said ball.

* * * * *